United States Patent
Jylha (10) Patent No.: US 8,362,721 B2
(45) Date of Patent: Jan. 29, 2013

(54) BATTERY POWERED MECHANIZED RAISE CLIMBING SYSTEM

(75) Inventor: Rick T. Jylha, Corbeil (CA)

(73) Assignee: J.S. Redpath Limited, North Bay (CA)

( * ) Notice: Subject to any disclaimer, the term of this patent is extended or adjusted under 35 U.S.C. 154(b) by 489 days.

(21) Appl. No.: 12/389,592

(22) Filed: Feb. 20, 2009

(65) Prior Publication Data

US 2009/0211853 A1 Aug. 27, 2009

Related U.S. Application Data

(60) Provisional application No. 61/030,280, filed on Feb. 21, 2008.

(51) Int. Cl.
*H02P 1/00* (2006.01)

(52) U.S. Cl. ............ 318/139; 318/376; 187/80; 187/91; 187/73; 187/250; 180/65.29; 180/68.5; 310/13; 310/14; 104/94; 104/48; 104/91

(58) Field of Classification Search .................. 318/139, 318/376; 310/12, 13, 14, 12.12; 187/80, 187/112, 73, 89, 91, 77, 251, 250; 180/65.29, 180/68.5; 104/94, 91, 48, 96, 89
See application file for complete search history.

(56) References Cited

U.S. PATENT DOCUMENTS

| | | | | |
|---|---|---|---|---|
| 3,378,106 | A * | 4/1968 | Wegner ........................ | 187/414 |
| 4,456,097 | A * | 6/1984 | Salihi .......................... | 187/289 |
| 4,554,999 | A * | 11/1985 | Kamaike ...................... | 187/290 |
| 5,751,076 | A * | 5/1998 | Zhou ........................... | 310/12.11 |
| 6,415,892 | B2 * | 7/2002 | Araki et al. .................. | 187/290 |
| 6,431,324 | B2 * | 8/2002 | Tajima et al. ................ | 187/290 |
| 7,987,794 | B2 * | 8/2011 | Grenon ........................ | 104/96 |
| 2004/0182652 | A1 * | 9/2004 | Ammon et al. .............. | 187/277 |
| 2008/0048497 | A1 * | 2/2008 | Donnelly et al. ............ | 307/19 |
| 2008/0121444 | A1 * | 5/2008 | Bauer .......................... | 180/65.1 |
| 2009/0014252 | A1 * | 1/2009 | Vedula et al. ................ | 187/290 |

FOREIGN PATENT DOCUMENTS

| | | |
|---|---|---|
| CA | 986542 A | 3/1976 |
| CA | 1224288 A1 | 7/1987 |
| CA | 2391616 A1 | 5/2001 |
| CA | 2346519 A1 | 10/2002 |
| GB | 2139831 A | 11/1984 |
| JP | 11-92059 A | 4/1999 |
| WO | WO 01/46056 A1 | 6/2001 |

OTHER PUBLICATIONS

Munoz Herrera, M.; Examination Report from corresponding Chilean Application No. 397-2009; Feb. 20, 2009.
International Search Report from corresponding PCT Application No. PCT/CA2009/000192; Bourgeois, P.; completed May 26, 2009; received by applicant Jun. 8, 2009.

\* cited by examiner

*Primary Examiner* — Walter Benson
*Assistant Examiner* — Jorge Carrasquillo
(74) *Attorney, Agent, or Firm* — Brett J. Slaney; John R. S. Orange; Blake, Cassels & Graydon LLP

(57) ABSTRACT

A battery powered raise climber system is provided that uses Lithium ion batteries to drive a single or double electric drive for an existing raise climber. The batteries offer a faster, safer, quieter and cleaner way to move workers and their equipment to and from the work face in a raise and eliminates the need for adding lengths of hose as the raise climber ascends and eliminates the emission of harmful inhalants. The battery powered system also enables high efficiency area lighting to be used at the work face, and as the raise climber descends in the raise, the electric drives can reverse operation to recharge the batteries.

22 Claims, 10 Drawing Sheets

BATTERY POWERED MECHANIZED RAISE CLIMBING SYSTEM

This application claims priority from U.S. application Ser. No. 61/030,280 filed on Feb. 21, 2008, the contents of which are incorporated herein by reference.

FIELD OF THE INVENTION

The invention relates to power systems for raise climbers.

BACKGROUND

It is sometimes required in an underground mine, to provide access from a lower level L thereof to an upper level U thereof. A mine owner may request that a raise excavation R be created from the lower level L to the upper level U, which is of a certain size/configuration and length. The raise R may be used to serve a variety of purposes such as air ventilation, secondary personnel access/egress or as material rock passes.

Figure 1:
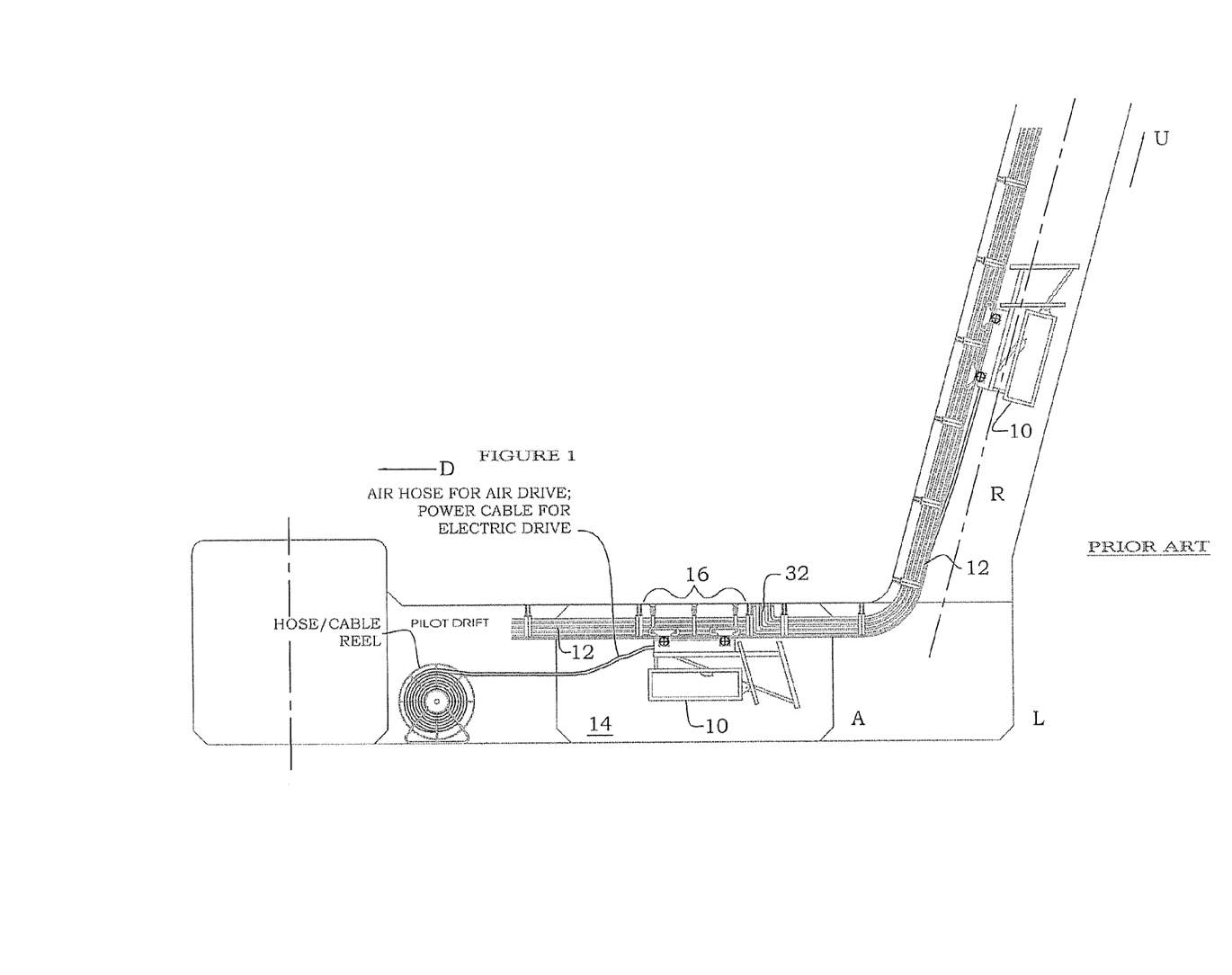
FIG. 1 is a schematic diagram showing a hose/cable reel supplied drive system for a raise climber.

To create the raise excavation R, typically a pilot or access drift A is first excavated from the main mine drift D to the proposed raise location as can be seen in FIG. 1. This provides access to the raise R for both personnel and muck removal equipment (not shown). In other cases, a raise can be opened up from above in a downward direction (sometimes referred to as being 'slashed').

The raise climber 10 requires a drive system in order move along the rail 12 and ascend into the raise R. Traditional drive systems for raise climbers 10 are pneumatic powered (single or double), electric, or hydraulic powered motors. The pneumatic and electric powered drive systems are supplied with air or electricity by a reel of hose or cable as shown in FIG. 1. Hydraulic powered drive systems are powered by an on board diesel engine (not shown) operating a hydraulic pump.

A pneumatic powered raise climber 10 is connected to an air system in the mine via an air hose, which is towed up the raise R behind the raise climber 10. Air pressure typically fluctuates and the efficiency of the pneumatic system is directly related to the number of connections in the air delivery system. Also, the volume of air decreases as the length of hose is increased and, as such, efficiency of the drive unit decreases as the raise climber 10 ascends in the raise R. The towed hose also adds approximately 1.8 kilograms per metre to the overall load. Therefore, as the length of the raise R and the deficiencies increase, the maximum carrying capacity of the drive system becomes limited. It has been found that a pneumatic powered system can often be limited to ascending only approximately 500 metres and typically only 300 meters or less.

An electric cable drive system is also connected to an electrical system present in the mine and is attached to the raise climber 10 via an electrical cable. This adds approximately 1.5 kilograms per metre to the overall load, again limiting the carrying capacity of the drive system. It has been found that an electric cable drive system can often be limited to ascending only approximately 1500 metres.

Since both the pneumatic powered and electric cable powered drive systems are fed power from a remote location via an "umbilical" hose, there also exists the possibility of the hose being damaged or severed thus interrupting power delivery and imposing safety issues particularly in the above-described electric drive systems due to the presence of a live power cable being loose in a raise and the difficulty in repairing the cable (and loss of power) if the cable is damaged or severed.

A diesel powered drive system does not require an umbilical hose or suffer from power degradation. However, the fumes emitted by a diesel engine can be deadly, especially in a confined area and thus must be removed from the work area by pumping large amounts of air through the work area. It can be appreciated that it may be difficult to move air through the raise R as it provides a 'dead end' while it is being excavated and until it reaches a break through point at the upper end U. The use of diesel powered systems is consequently either banned or restricted to special circumstances by the appropriate authorities. In fact, since the early 1980s, the use of diesel units in mines in the Province of Ontario, Canada, was turned down due to fire hazard, ventilation problems and a lack of practical experience. Only for emergency purposes are diesel units therefore typically permitted.

It is therefore an object of the following to provide a power system for a raise climber that obviates or mitigates the above-noted disadvantages.

SUMMARY

In one aspect, there is provided a battery powered drive system for a raise climber comprising one or more batteries connected to one or more electric motors through one or more respective variable frequency drives that enables the batteries to power the electric motors when the raise climber ascends and to recharge the batteries when the raise climber descends.

BRIEF DESCRIPTION OF THE DRAWINGS

An embodiment of the invention will now be described by way of example only with reference to the appended drawings wherein.

DETAILED DESCRIPTION OF THE DRAWINGS

It has been recognized that a raise climber is used in an environment conducive to enabling a battery powered drive system to be used, due to: (a) the typical duration of use for each trip; (b) the vertical direction of travel; and (c) the downtime between trips. Since in many applications, a raise climber only requires power to ascend to the rock face before blasting and then must return to the access drift A to clear away from the blast, many short trips are made and a similar number of idle periods exist, that enable recharging sessions or battery swapping or both while waiting in the access drift A for the next trip. The vertical direction of travel means that power is only required for half of the trip and thus even if the raise climber's batteries drain while at the rock face, it will not be stranded in the raise (since it can rely on gravity to return). Moreover, during descent, the batteries can regenerate up to a certain percentage of capacity based on the efficiencies of the overall system and its configuration.

Since battery power can be increased or decreased by simply adding or removing cells as needed, a battery powered raise climber can be implemented by matching the number of cells appropriate to the weight of the unit, which although is typically similar, can differ from model to model. Furthermore, existing raise climbers can be adapted to accommodate the batteries without disrupting the structural integrity of the raise climber.

Figure 2:
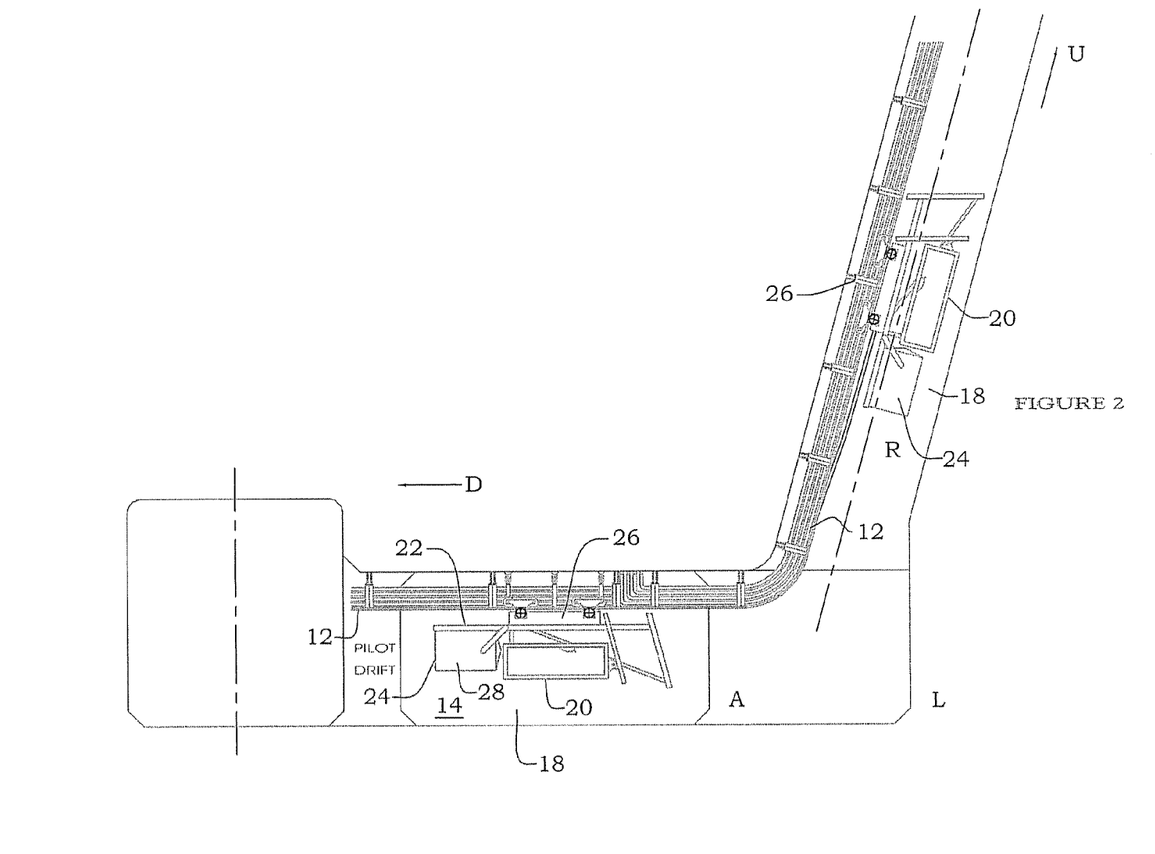
FIG. 2 is a schematic diagram showing a raise climber having a battery powered drive system.
Figure 3:
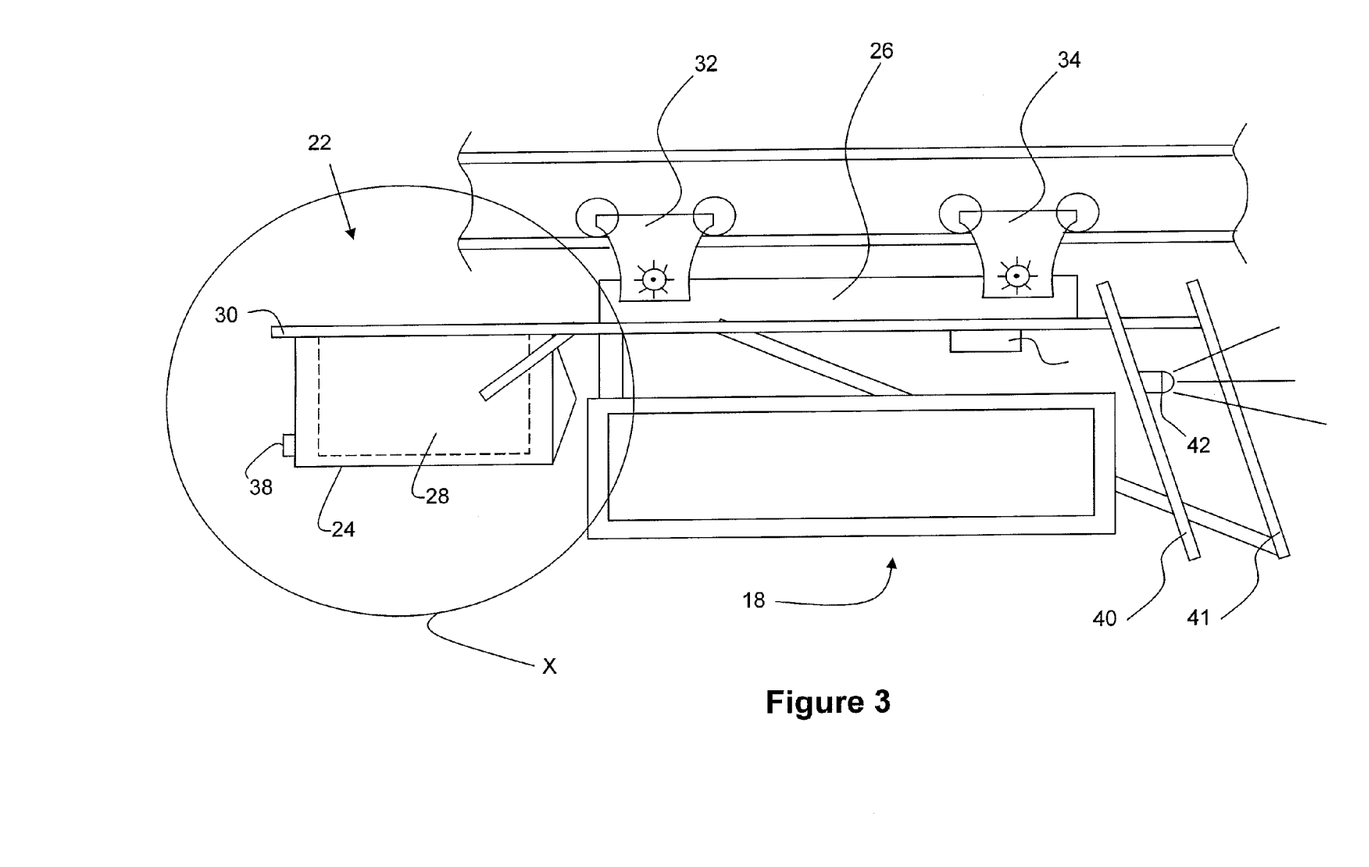
FIG. 3 is an enlarged profile view of the raise climber shown in FIG. 2.

Turning now to FIGS. 2 and 3, to avoid the inefficiencies and/or safety hazards associated with the above-described power systems, and by recognizing the suitability of the raise excavating process discussed above, a battery powered raise climber system 18 has been developed, which includes a raise climber 20 having a single or double electric drive 26 and a battery enclosure 24 containing one or more batteries 28 having a high energy/mass ratio, the batteries 28 typically being mounted in an existing mounting area 22 that was originally designed for another drive system. In this way, existing raise climbing equipment can be modified to accommodate and utilize the battery enclosure 24 so as to provide an electric drive 26 with power without requiring an 'umbilical' cord. In some embodiments, a standard raise climber 20 such as an Alimak STH-5EE can be retrofitted by removing the trailing cable to the motor drives. A cage (not shown) may then be constructed and supported under the Alimak raise climber 20 to hold both the batteries 28 and the other equipment such as variable frequency drives (to be explained below).

The batteries 28 are in one example utilize Lithium-Ion technology, which has been found to have a suitable energy/mass ratio. It will be appreciated that other battery technology with similar performance criteria, in particular the energy/mass ratio achieved by the Lithium-Ion technology may also be used. It has been found that Lithium-Ion batteries 28 currently provide the best power-to-mass ratio and suitable charge times that enable multiple trips on a single charge, in particular when using regeneration as discussed below. For example, EU1 Lithium Phosphate cells from the Epoch family manufactured by Valence Technology™ can be used, wherein each cell has a capacity of 42 Ah at a voltage of 12.8V, weighs approximately 7 kg, has a charge voltage of 14.6V, float voltage of 13.8V, and maximum continuous charging amperage of 40 A.

It may be noted that in applications where the raise is slashed from the top, the battery powered mechanized raise climber herein described may start with a fully charged battery and descend down, regenerating power. In such an event, or if a supply side fuse were to blow, the system can be designed to have dynamic braking resistor and control circuitry to prevent overcharging of the batteries.

In some embodiments, one or two 7.6 kW AC motors, depending on the weight of the raise climber 20, are required to be operated for approximately 15 minutes without power disruption. The motors are supplied from respective variable frequency AC drives 58 which obtain energy from the batteries 28 and should be capable of lifting the weight of the raise climber 20 300 meters or more. It may be noted that preferably one drive 58 is provided for each electric motor to provide redundancy in case of failure. In embodiments comprising multiple inverters, such multiple inverters can be configured to both draw energy from a common battery source.

In one example, an AC frequency drive supplies two 230 V, 3 phase, 10 HP motors that, in such an example would require a DC bus voltage of between 340 V and 310 V. The relatively lower DC voltage (e.g. when compared to 380 V motors, enables a ground fault detection scheme (not shown) to be installed with the batteries 28, which can detect ground faults between the external battery connections, thus reducing the risk of shock hazards. It may be noted that the voltage required is based on the voltage of the electric motor. This example illustrates a configuration that utilizes existing electric motors to maintain the integrity of the design. It has been found that at full speed, the raise climber 20 in this configuration operates at full load conditions for approximately 15 minutes as noted above. When assuming an 80% efficiency for the batteries 28, approximately 5 kWH of energy will need to be delivered in such a 15 minute period. Batteries such as U1-12XP 12.8V batteries available from Valence Technology, Inc.™ of Austin Tex., USA, are suitable and have a cut off voltage of 10.5 V. To attain the maximum DC bus voltage of 347 VDC, 27 batteries @ 12.8 V per battery can be used, which would also result in an end voltage higher than the minimum DC bus voltage of 283 V. It can be appreciated that U1-12XP batteries are only one example and many others are available. For example, in some cases, due to the lower motor voltage and higher required amperage, a UEV-18XP battery may instead be used. For the U1 batteries noted above, it has been found that 73.5 amps can be supplied for ½ hour, before the cut off voltage is reached (when based on the maximum output of the raise climber 20 which is generally a conservative estimate). When using regenerative braking that can potentially recover up to 50% of the energy during descent, there is the possibility of performing three 15 minute trips on a single charge, at maximum payload. It can be appreciated that the raise climber 20 in many cases does not always operate at maximum payload therefore extending this capability (i.e. this considers the worst case scenario). It can also be appreciated that the number of trips and duration of each trip as well as the type of batteries in different configurations may operate differently. It can be seen that the use of batteries 28 that have a suitable energy/mass ratio makes a "cordless" electric drive system feasible whereas other battery technologies such as lead acid, nick cadmium etc. are too heavy and do not provide sufficient energy (i.e. lower energy/mass ratio).

Figure 4:
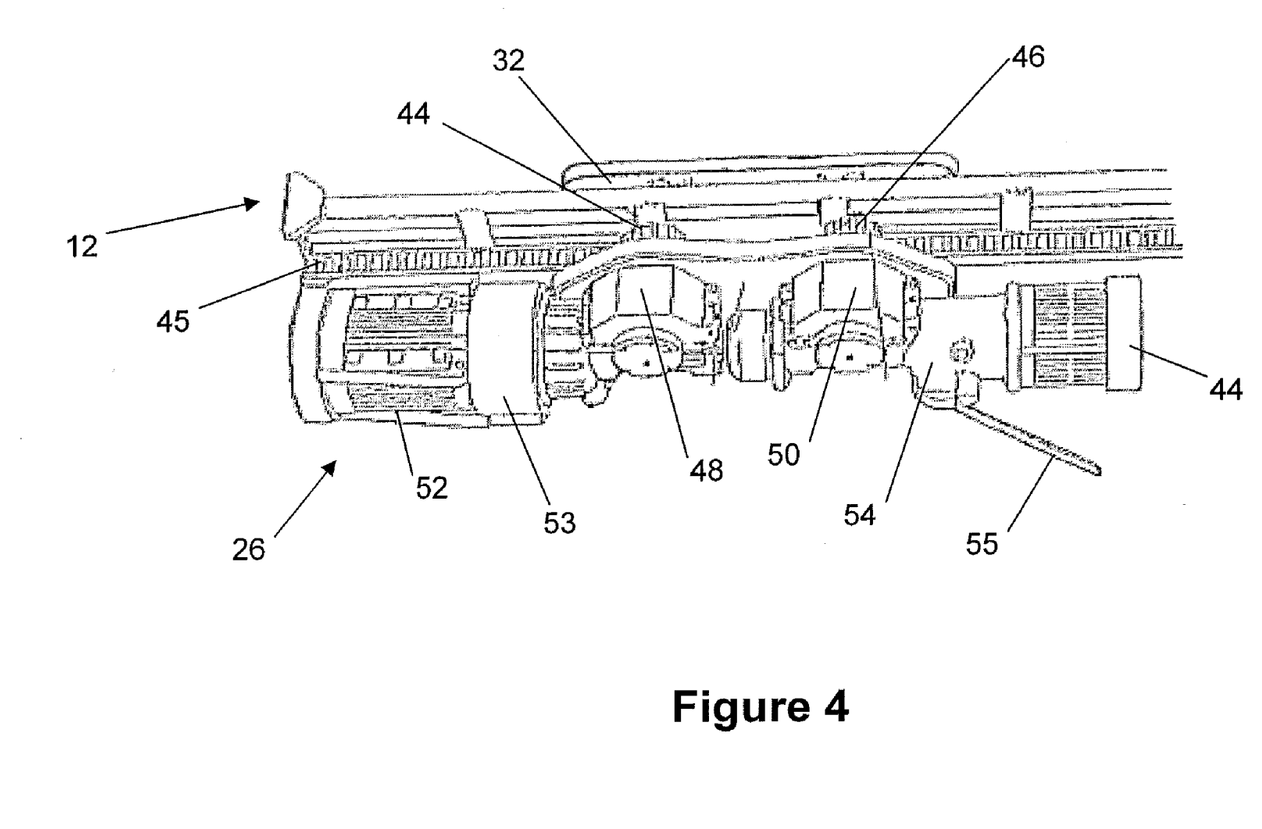
FIG. 4 is a perspective view of a double-motor electric drive for the raise climber shown in FIG. 3.

The raise climber 20 also includes an operator control 36, a telescoping operator platform 40 and a safety canopy 41 which are well known raise climber components. Referring also to FIG. 4, the electric drive 26 is in one embodiment, a standard double drive electric system which utilizes an electric motor 52 to provide motive power to first and second pinions 44, 46 which include teeth for engaging a track 45 in the rail 12. The electric motor 52 powers the pinions 44, 46 through corresponding worm gears 48 and 50 and uses a centrifugal clutch 53. The clutch 53 provides a "soft start" with a fixed speed motor. It will be appreciated that the clutch 53 may also be replaced in applications using an inverter/variable frequency drive 58 with a standard coupling in order to provide reduced operational speed. In such cases, the clutch housing would be retained but the clutch mechanism (inside) replaced with a standard coupling. This enables variable speed operation of the raise climber 20 (which is not provided with an umbilical electrical drive system). To enable regeneration, the worm gear drive needs to spin the electric motor which is inhibited by the clutch mechanism. The ability to move at a controlled speed allows the operator to better maneuver the raise climber 20, facilitating the installation of the raise climber rail 12.

To provide back-up braking power in case of failure of the control brake 54, a centrifugal brake 51 is also provided. The control brake 54 can be operated by the operator using a control handle 55. FIG. 3 shows a roller assembly 32 that is fixed to the electric drive system 26. Turning to FIG. 4, a roller assembly 32 engages and rolls along the other side of the rail 12 as the raise climber 20 moves along the rail 12. As will be discussed in greater detail below, the raise climber 20 during descent, is electrically braked during the battery 38 recharging cycle thereby recovering the energy, that would otherwise dissipate as heat, for reuse.

Figure 5:
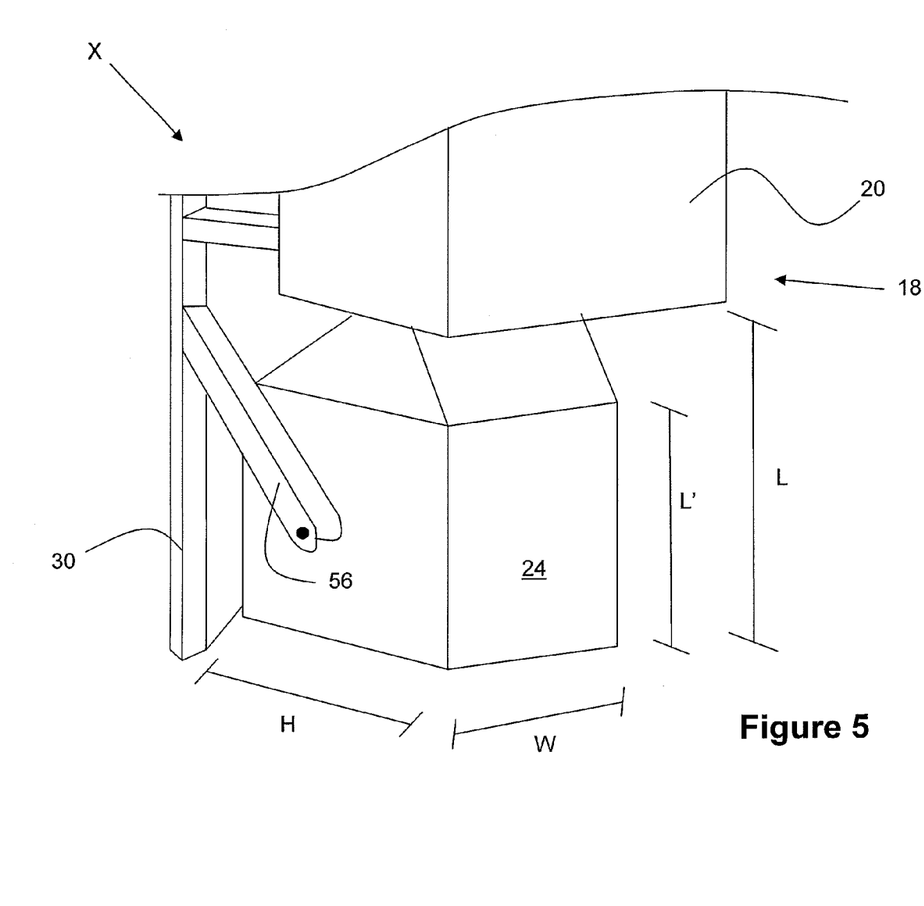
FIG. 5 is an enlarged perspective view of region X shown in FIG. 3.

In one embodiment, shown best in FIGS. 3 and 5, the battery enclosure 24 is supported by a pre-existing mounting bracket 30 from an existing diesel hydraulic raise climbing system with the electric drive system 26 replacing the hydraulic drive. In this way, the battery enclosure 24 is adapted to fit within a diesel motor mounting location 22 on an existing hydraulic raise climber 20 modified to include an electric drive system 26, in order to retain the structural integrity of the raise climber 20 and to ensure that the enveloping dimensions and clearances are not exceeded. It will be appreciated that any existing or new raise climber 20 can be adapted to include the battery enclosure 24 and electric drive 26, including new designs.

As also shown in FIG. 3, the batteries 28 enable energy efficient area lighting 42 to be installed on the raise climber 20 to provide illumination at the work face. Previous raise climbers (e.g. raise climber 10 in FIG. 1) were not readily equipped to provide such lighting (e.g. no external source of electricity) and thus personnel still relied on personal lighting attached to their safety helmets. As such, in previous uses, the only lighting in the work area could be provided by a miner's hat light, which is limited by a battery pack that needs to be worn by the miner and typically only provides illumination in a direction that the miner is looking. The additional lighting 42 in this embodiment provides much needed illumination in an otherwise dim work area. This results in a safer and more amenable environment.

FIG. 5 shows portion X identified in FIG. 3, which is a three-dimensional view that shows the arrangement of the battery enclosure 24 within the mounting area 22 of the existing raise climber 20. In this example, the mounting area 22 includes diagonal brackets 56 (only one shown in FIG. 5), which would normally permit the diesel hydraulic motor to rotate as the raise climber 20 changes inclination so as to avoid oil leakage. Since the batteries 28 do not have the same issues, the brackets 56 can optionally be used to fix the enclosure 24 in one position rather than permitting the normal pivoting action. It will be appreciated that other mounting techniques may be used depending on make and model of the existing raise climber 20. The examples described herein are particularly suitable for raise climbers supplied by Arkbro Industries™, including the single drive model ABI-5A and the double drive model ABI-5AA. It may be noted that the decks 40 for the drive units are typically made specific for each raise size.

As can be seen in FIG. 5, the length L', width W and height H of the enclosure 24 is within the dimensions that would normally permit rotation of the diesel hydraulic unit without interfering with the raise R or the rail 12, for example by not extending beyond the allotted length L.

Figure 6:
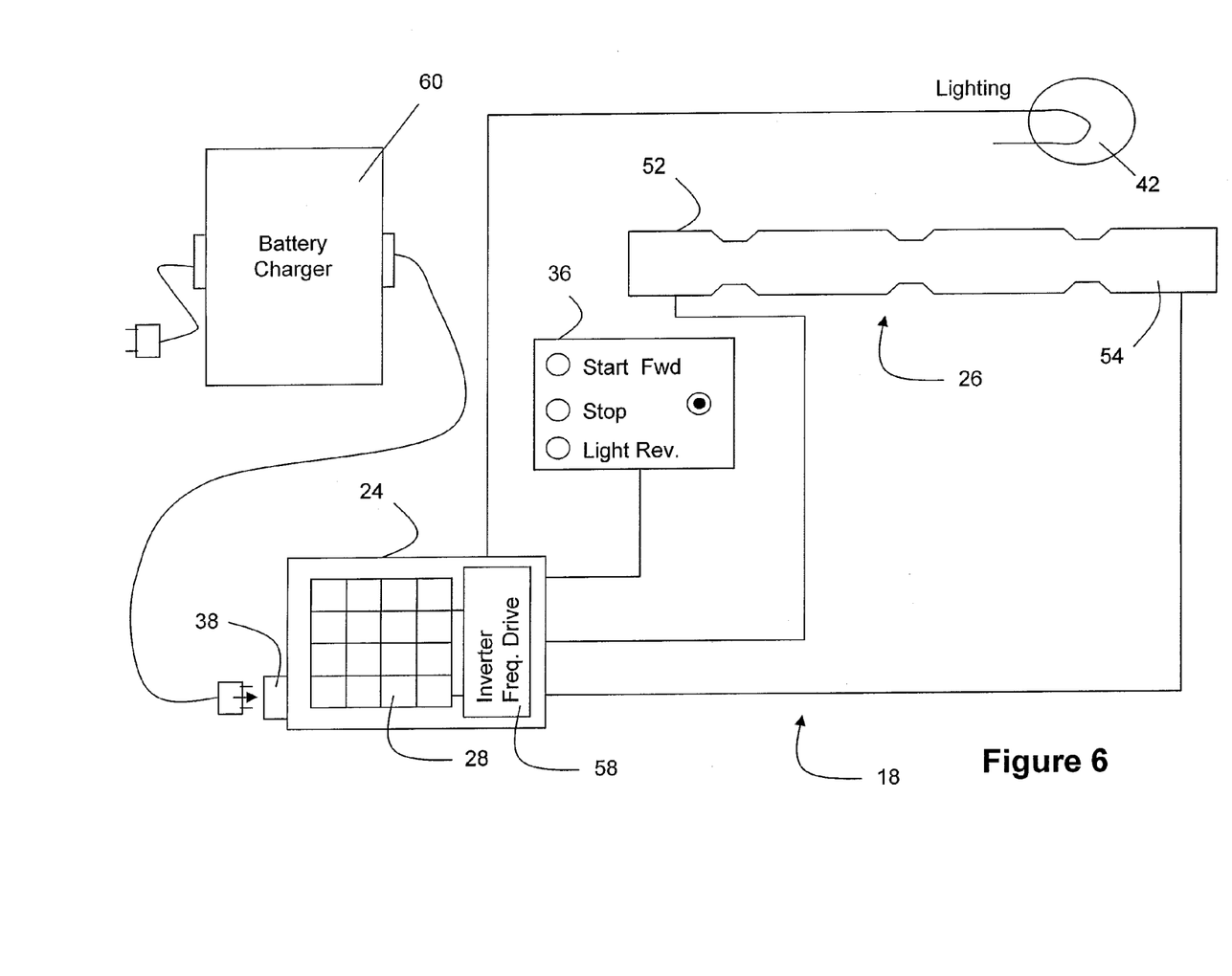
FIG. 6 is a block diagram of the battery powered drive system for the raise climber shown in FIG. 2.

FIG. 6 illustrates an electrical schematic of the battery powered raise climber system 18. The Lithium-Ion batteries 28 used in this example are connected to an inverter/frequency drive 58, which enables power to be supplied to the electric drive 26 and power in the batteries 28 to be regenerated during braking. It will be appreciated that a series connection or a series parallel connection may be used depending on the required amp-hour discharge rate. The size of the batteries 28 may also be a consideration since larger modules with more capacity may be preferred over many smaller modules in series or parallel combinations. As noted above, it has been recognized that a raise climbing environment is particularly suitable for using regenerative braking as there are typically several return trips in a downward direction that can reverse the operation of the drive 26 such that it acts as a generator. In this way, fewer recharges are required as the batteries 28 can be partially recharged on each return trip, fewer batteries can also be used for a given size/weight, and longer operating times are possible by using more batteries than required for a given size/weight. Since the use of the high energy/mass batteries 28 avoids the need to rely on outside power sources, the battery powered system 18, in whatever enclosure, cradle or other mounting configuration, is advantageously designed with a quick attach/disconnect feature to enable batteries 28 to be swapped and not necessarily even rely on a recharge in the mine, i.e. new batteries can be brought down for replacement purposes if feasible in the particular environment.

The regenerating mode can thus take advantage of the often great distances retraced by the raise climber 20 as it moves out of the raise R in between blasts. Since the raise R is substantially vertical, gravity enables the electric drive 26 to be reversed during descent whilst the regenerating mode harnesses the movement of the pinions 44, 46 along the track 45.

The battery powered raise climber system 18 does not require attachment of an umbilical hose and thus reduces the time required to ascend to the work face in the raise R and back to the docking area. Without a hanging hose or cable, the battery powered system 18 can maintain a consistent speed and consistent load capacity, regardless of the height of the raise, since the batteries 28 do not add any additional load during use (i.e. the weight is constant). The batteries 28 are also inherently safer as an umbilical hose does not interfere with operation of the raise climber 20 and there is not the presence of harmful emissions (e.g. Lithium-Ion batteries are non-gassing batteries). Moreover, the battery powered system 18 does not require outside power sources and thus the raise climber 20 can be deployed where the mine services such as air and electricity are not immediately available or are expensive to tap into. In some instances, recharging the batteries 28 can even be done off-site, since the batteries 28 can be removed from the enclosure 24 and taken to a more convenient location for the battery charger 60. This is particularly useful where emissions from diesel-powered generators need to be avoided. As such, the battery powered system 18 enables a cleaner, safer, more efficient, and more convenient work environment when creating a raise R.

Turning back to FIG. 6, the operator can control the system 18 using the control panel 36, by providing Start, Stop, and speed control in both directions (e.g. FWD and REV functions shown in FIG. 6) as well as a control or switch for the lighting 42. When a complete recharge is needed, a battery charger 60 can be plugged into a receptacle 38 protruding from the enclosure 24, or taken offsite to the battery charger 60 as noted above. The charger 60 in one embodiment is constructed be a standard solid state DC motor drive that is configured to provide a regulated charging voltage, which can be more cost effective than designing a high voltage DC charger. It will be appreciated that the battery charger 60 is in general specific to the battery technology used. It has been found that some Lithium-ion batteries, in particular the newest versions, do not require special or sophisticated chargers and can accept high charge rates, which also lends such batteries to the recharging process during descent described above. Therefore, the charging process can be readily accommodated without dedicated, sophisticated equipment.

Figure 7:
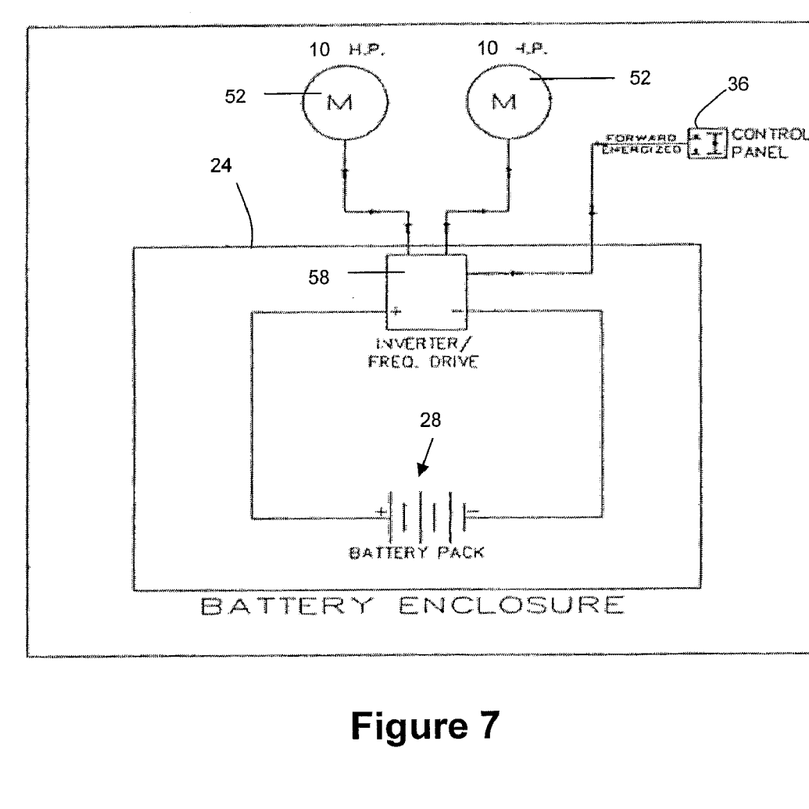
FIG. 7 is an electrical schematic during a drive operation.
Figure 8:
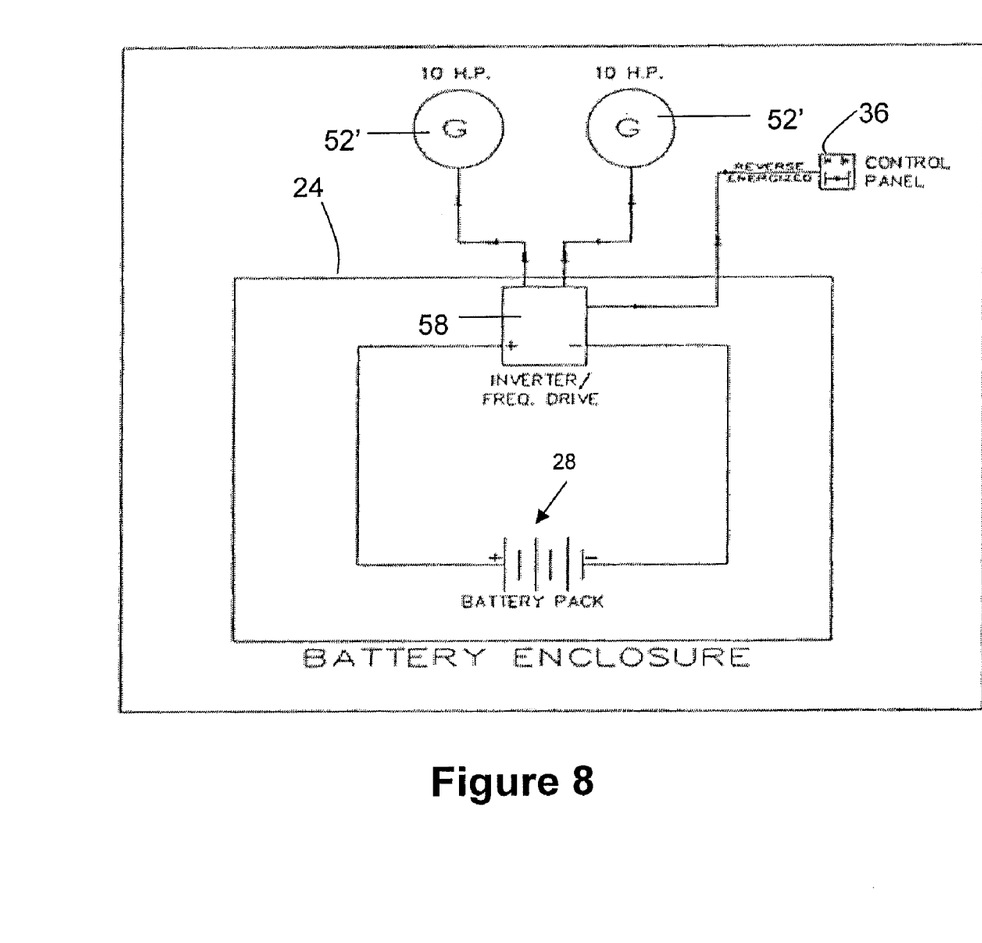
FIG. 8 is an electrical schematic during a regenerative braking operation.

FIG. 7 shows an electrical schematic during a drive operation and FIG. 8 shows an electrical schematic during a regeneration or braking operation. It can be seen from FIG. 7 that when the operator has selected the FWD control, the inverter/frequency drive 58 energizes the electric motors 52 of each electric drive 26 (in a double drive arrangement) by supplying power from the batteries 28 connected in series. It may be appreciated that, to increase the amorphous capacity of the batteries, a series-parallel configuration can be adopted. As shown in FIG. 8, when the operator selects the REV control and the raise climber 20 descends through the raise R, the motors 52 reverse their operation and act as generators 52'. At the same time, the inverter/frequency drive 58 reverses the flow of electricity so as to charge the batteries 28.

Figure 9A:
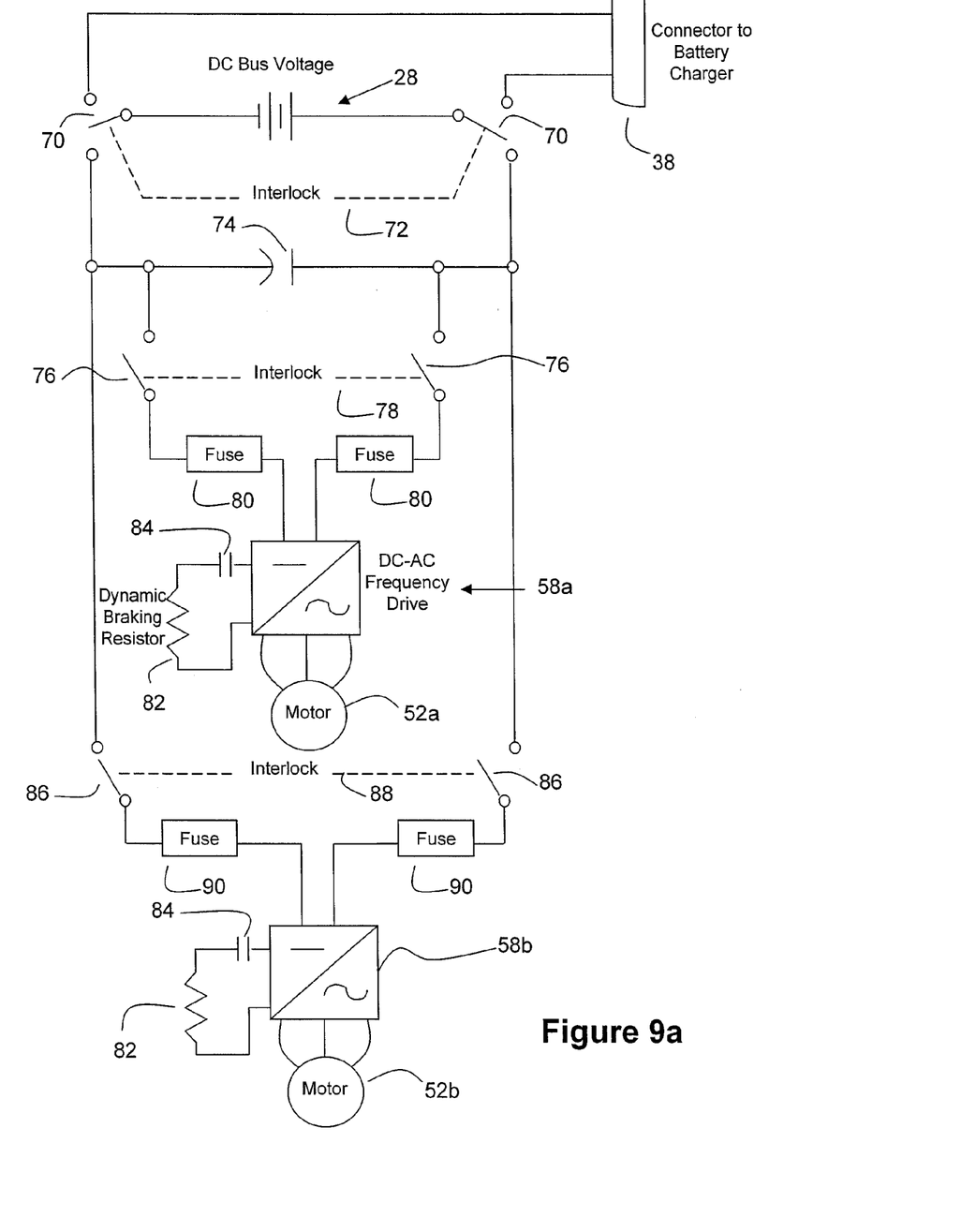
FIG. 9a is an electrical schematic for a dual-electric motor battery powered drive system.

As noted above, to provide redundancy, a separate inverter/frequency drive 58 may be provided for each motor 52. Turning now to FIG. 9a, an embodiment showing such redundancy is illustrated. As shown in FIG. 9a, the batteries 28, which when connected create a specific DC bus voltage, may be switched between a charging configuration and an operational configuration through activation of a first pair of interlocked switches 70, wherein numeral 72 signifies that the two switches 70 are mechanically tied together. The batteries 28 are connected to a modular master/slave configured drive system by a polarized capacitor 74 (which is shown conceptually in FIG. 9a but would typically be integral with the drive 58). The master/slave configuration allows the raise climber 20 to operate on a single motor 52 in the event of a drive failure. Each drive may also include a NEMA 4X rated enclosure to allow for removal of one drive while allowing the other drive to operate the raise climber 20. The two drives in the master/slave configuration operate from a common DC bus voltage supplied by the batteries to provide three-phase power to the motors 52.

A first motor 52a is driven by a first DC-AC frequency drive 58a, which can also be connected/disconnected through a second set of interlocked switches 76, wherein numeral 78 indicates that they are mechanically tied to each other. The drive 58a is protected by a pair of fuses 80 and includes a dynamic braking resistor 82 which is a high power/wattage resistor used to assist in dynamic braking, with accompanying relay contact 84. The relay contact 84 closes as required to dissipate the excess energy into the dynamic braking resistor 82, and is controlled by the frequency drive 58a. A second motor 52b is driven by a second drive 58b, which can also be connected/disconnected through a third set of interlocked switches 86, wherein numeral 78 indicated they are mechanically tied to each other. A fuse 90 is shown between the second drive 58b and the interlocked switches 86. The second drive 58b also has a dynamic braking resistor 82 for assisting in dynamic braking. The switches 70 operate as a transfer switching mechanism for changing between the charging and operating modes. The interlocked switches 76, 86 are used to isolate the drives in the event of single motor operation or for maintenance. The master/slave relationship is based on which drive receives the speed feedback from the tachometer. The slave drive would simply then follow the direction from the master drive.

Figure 9B:
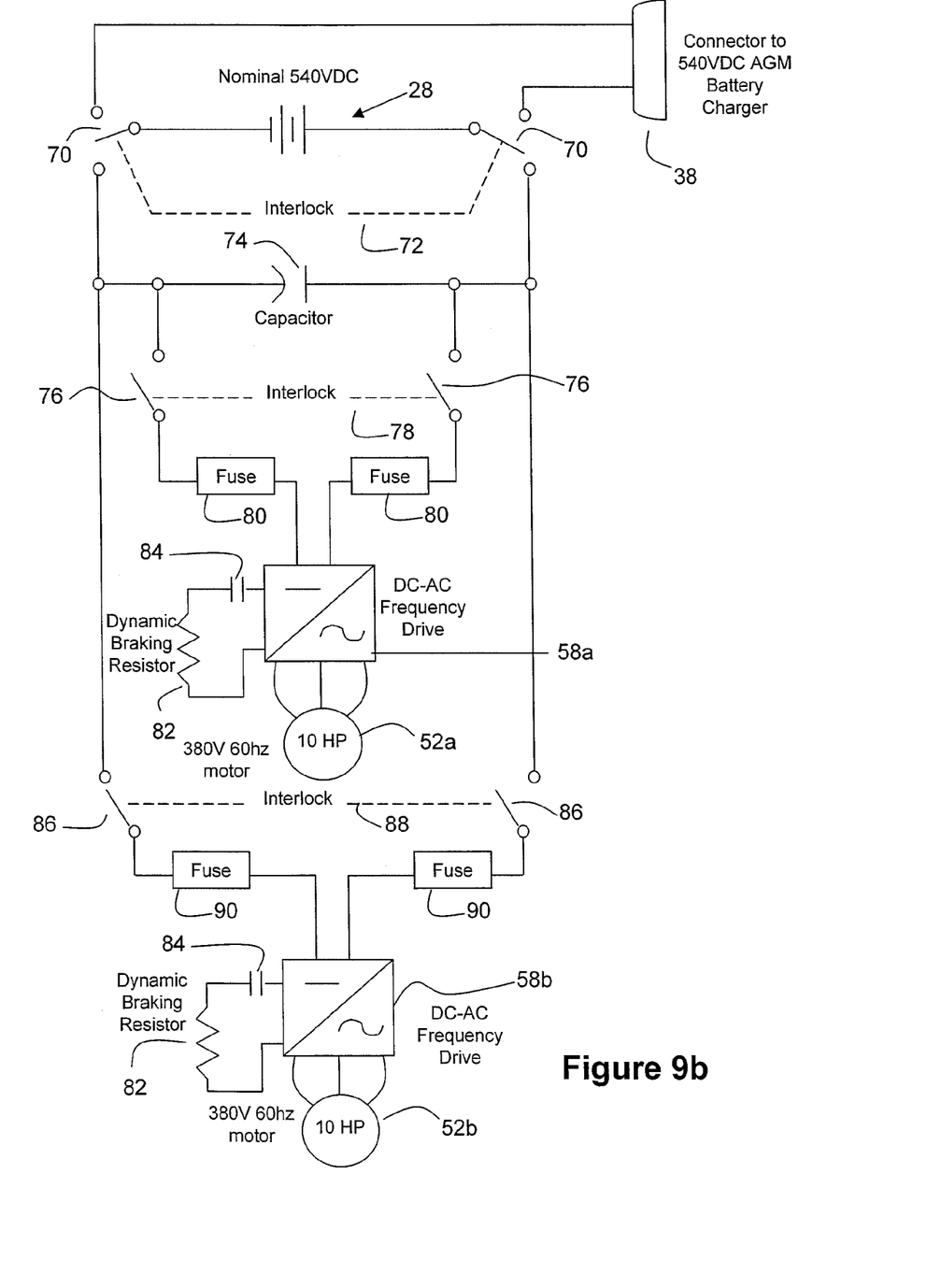
FIG. 9b is an electrical schematic per FIG. 9a in one embodiment.

FIG. 9b illustrates a specific example of the configuration shown in FIG. 9a wherein a 540VDC 28 is used, with 380V, 60 Hz, 10 HP motors 52a, 52b.

It will be appreciated that the drives can also utilize a closed loop speed control based on a tachometer mounted on the shaft of the motor 52 (not shown). Speed control via a high resolution joystick can also be provided to allow the operator to control the speed in both directions. In the event that the batteries 28 are fully charged during a descent, current should be diverted to a resistor grid to dissipate the excess power.

It can therefore be seen that the battery powered raise climber system 18 offers a faster, safer, quieter and cleaner way to move workers and their equipment to and from the work face in a raise R. Moreover, less frequent and more convenient maintenance at a lower cost can be achieved, in part because the batteries 28 can more easily be removed and transported than other drive systems. The safer work area is also benefited by the use of the high efficiency area lighting 42 and does not emit harmful air borne inhalants. The quieter battery powered system 18 can also provide a constant speed and payload throughout the entire trip through the raise R, regardless of its length. Due to the elimination of an umbilical cord to deliver power, and the consistent overall weight, the raise climber 20 is capable of ascending higher and thus creating longer raises R.

Although the invention has been described with reference to certain specific embodiments, various modifications thereof will be apparent to those skilled in the art without departing from the spirit and scope of the invention as outlined in the claims appended hereto.

The invention claimed is:

1. A method of adapting a raise climber to be driven using a battery powered drive system for operating the raise climber in a mine without a tethered cable or fume emitting engine, the method comprising:

incorporating one or more electric motors into the battery powered drive system;

determining a number of batteries that can be accommodated according to the weight of the raise climber and the weight that the raise climber would be required to carry if the tethered cable or fume emitting engine were used to operate the raise climber;

supporting the number of batteries on the raise climber; and connecting the number of batteries to the one or more electric motors through one or more respective variable frequency drives that enables the batteries to power the electric motors when the raise climber ascends and to recharge the batteries when the raise climber descends.

2. The method of claim 1 wherein said batteries are Lithium-ion batteries.

3. The method of claim 1, further comprising incorporating a pair of motors and a pair of corresponding variable frequency drives in a master/slave configuration.

4. The method of claim 1, further comprising incorporating high efficiency lighting powered by said batteries.

5. The method of claim 1 further comprising incorporating, for each variable frequency drive, a dynamic braking resistor to assist in dynamic braking of said motors.

6. The method of claim 1 further comprising providing an operator controller for driving said raise climber forwards and backwards.

7. The method of claim 6 further comprising providing a closed loop speed control and tachometer mounted on a shaft of said motor.

8. The method of claim 6 wherein said operator controller comprises a high resolution joystick.

9. The method of claim 1 further comprising incorporating a connector for charging said batteries using a battery charger.

10. The method of claim 1 being performed to retrofit an existing raise climber.

11. The method of claim 10 wherein said existing raise climber comprises a diesel motor mounting area and the method further comprises installing at least a portion of the drive system i in the diesel motor mounting area.

12. A raise climber to be used in a mine, the raise climber designed to normally operate in the mine using a tethered cable or fume emitting engine, the raise climber comprising:
   a battery powered drive system adapted to the raise climber for operating the raise climber in the mine without the tethered cable or fume emitting engine, the battery powered drive system comprising:
      one or more electric motors incorporated into the battery powered drive system; and
      one or more batteries determined according to the weight of the raise climber and the weight that the raise climber would be required to carry if the tethered cable or fume emitting engine were used to operate the raise climber, the one or more batteries being supported in an enclosure on the raise climber and connected to the one or more electric motors through one or more respective variable frequency drives to have the batteries power the electric motors when the raise climber ascends and to recharge the batteries when the raise climber descends.

13. The raise climber according to claim 12, wherein said batteries are Lithium-ion batteries.

14. The raise climber according to claim 12, comprising a pair of motors and a pair of corresponding variable frequency drives in a master/slave configuration.

15. The raise climber according to claim 12 further comprising high efficiency lighting powered by said batteries.

16. The raise climber according to claim 12 further comprising, for each variable frequency drive, a dynamic braking resistor to assist in dynamic braking of said motors.

17. The raise climber according to claim 12 further comprising an operator controller for driving said raise climber forwards and backwards.

18. The raise climber according to claim 17 further comprising a closed loop speed control and tachometer mounted on a shaft of said motor.

19. The raise climber according to claim 17 wherein said operator controller comprises a high resolution joystick.

20. The raise climber according to claim 12 further comprising a connector for charging said batteries using a battery charger.

21. The raise climber according to claim 12, wherein the raise climber is retrofitted from an existing raise climber.

22. The raise climber according to claim 21 wherein said existing raise climber comprises a diesel motor mounting area and at least a portion of the drive system is housed in the diesel motor mounting area.

* * * * *